(12) United States Patent
Shennib et al.

(10) Patent No.: US 10,489,833 B2
(45) Date of Patent: Nov. 26, 2019

(54) REMOTE VERIFICATION OF HEARING DEVICE FOR E-COMMERCE TRANSACTION

(71) Applicants: Adnan Shennib, Oakland, CA (US); Varun Bhardwaj, Oakland, CA (US)

(72) Inventors: Adnan Shennib, Oakland, CA (US); Varun Bhardwaj, Oakland, CA (US)

(73) Assignee: IHEAR MEDICAL, INC., San Leandro, CA (US)

( * ) Notice: Subject to any disclaimer, the term of this patent is extended or adjusted under 35 U.S.C. 154(b) by 740 days.

(21) Appl. No.: 15/166,040

(22) Filed: May 26, 2016

(65) Prior Publication Data

US 2016/0350821 A1 Dec. 1, 2016

Related U.S. Application Data

(60) Provisional application No. 62/168,233, filed on May 29, 2015.

(51) Int. Cl.
G06Q 30/00 (2012.01)
G06Q 30/06 (2012.01)
(Continued)

(52) U.S. Cl.
CPC ....... *G06Q 30/0601* (2013.01); *G06Q 20/108* (2013.01); *G06Q 20/4014* (2013.01);
(Continued)

(58) Field of Classification Search
None
See application file for complete search history.

(56) References Cited

U.S. PATENT DOCUMENTS 4,759,070 A 7/1988 Voroba
5,197,332 A 3/1993 Shennib
(Continued)

FOREIGN PATENT DOCUMENTS

JP 2008109594 A 5/2008
KR 1020050114861 A 12/2005
(Continued)

OTHER PUBLICATIONS

Internet Archive, World Health Organization website "Grades of Hearing Impairment". Retrieved from <https://web.archive.org/web/20121024120107/http://www.who.int/pbd/deafness/hearing_impairment_grades/en> on Aug. 27, 2015.
(Continued)

*Primary Examiner* — Mila Airapetian
(74) *Attorney, Agent, or Firm* — Dorsey & Whitney LLP

(57) ABSTRACT

Disclosed herein are examples of methods and systems for performing remote verification of a hearing device, particularly for use by a non-expert user outside the clinical environment. A status and/or functionality of the hearing device may be verified using verification criteria. Upon verifying the status and/or the functionality of the hearing device, a user may be permitted to conduct an e-commerce transaction. The status of the hearing device may include identification information associated with the hearing device and/or the user. The functionality of the hearing device may include a calibration and/or a system performance.

9 Claims, 12 Drawing Sheets

(51) Int. Cl.
*H04R 25/00* (2006.01)
*G06Q 20/10* (2012.01)
*G06Q 20/40* (2012.01)
*H04L 29/06* (2006.01)

(52) U.S. Cl.
CPC ............ *H04L 63/08* (2013.01); *H04R 25/30* (2013.01); *H04R 25/554* (2013.01); *H04R 2225/55* (2013.01)

(56) References Cited

U.S. PATENT DOCUMENTS

| | | |
|---|---|---|
| 5,327,500 A | 7/1994 | Campbell |
| 5,553,152 A | 9/1996 | Newton |
| 5,645,074 A | 7/1997 | Shennib et al. |
| 5,659,621 A | 8/1997 | Newton |
| 5,701,348 A | 12/1997 | Shennib et al. |
| 5,785,661 A | 7/1998 | Shennib et al. |
| 5,928,160 A | 7/1999 | Clark |
| 6,137,889 A | 10/2000 | Shennib et al. |
| 6,212,283 B1 | 4/2001 | Fletcher et al. |
| 6,319,207 B1 | 11/2001 | Naidoo |
| 6,359,993 B2 | 3/2002 | Brimhall |
| 6,367,578 B1 | 4/2002 | Shoemaker |
| 6,379,314 B1 | 4/2002 | Horn |
| 6,382,346 B2 | 5/2002 | Brimhall et al. |
| 6,428,485 B1 | 8/2002 | Rho |
| 6,447,461 B1 | 9/2002 | Eldon |
| 6,473,513 B1 | 10/2002 | Shennib et al. |
| 6,522,988 B1 | 2/2003 | Hou |
| 6,546,108 B1 | 4/2003 | Shennib et al. |
| 6,674,862 B1 | 1/2004 | Magilen |
| 6,724,902 B1 | 4/2004 | Shennib et al. |
| 6,816,601 B2 | 11/2004 | Lin et al. |
| 6,840,908 B2 | 1/2005 | Edwards et al. |
| 6,937,735 B2 | 8/2005 | DeRoo et al. |
| 6,940,988 B1 | 9/2005 | Shennib et al. |
| 6,978,155 B2 | 12/2005 | Berg |
| 7,010,137 B1 | 3/2006 | Leedom et al. |
| 7,016,511 B1 | 3/2006 | Shennib |
| 7,037,274 B2 | 5/2006 | Thoraton et al. |
| 7,113,611 B2 | 9/2006 | Leedom et al. |
| 7,215,789 B2 | 5/2007 | Shennib et al. |
| 7,260,232 B2 | 8/2007 | Shennib |
| 7,298,857 B2 | 11/2007 | Shennib et al. |
| 7,310,426 B2 | 12/2007 | Shennib et al. |
| 7,321,663 B2 | 1/2008 | Olsen |
| 7,403,629 B1 | 7/2008 | Aceti et al. |
| 7,424,123 B2 | 9/2008 | Shennib et al. |
| 7,424,124 B2 | 9/2008 | Shennib et al. |
| 7,580,537 B2 | 8/2009 | Urso et al. |
| 7,664,282 B2 | 2/2010 | Urso et al. |
| 7,854,704 B2 | 12/2010 | Givens et al. |
| 7,945,065 B2 | 5/2011 | Menzl et al. |
| 8,073,170 B2 | 12/2011 | Kondo et al. |
| 8,077,890 B2 | 12/2011 | Schumaier |
| 8,155,361 B2 | 4/2012 | Schindler |
| 8,184,842 B2 | 5/2012 | Howard et al. |
| 8,243,972 B2 | 8/2012 | Latzel |
| 8,284,968 B2 | 10/2012 | Schumaier |
| 8,287,462 B2 | 10/2012 | Givens et al. |
| 8,379,871 B2 | 2/2013 | Michael et al. |
| 8,396,237 B2 | 3/2013 | Schumaier |
| 8,447,042 B2 | 5/2013 | Gurin |
| 8,467,556 B2 | 6/2013 | Shennib et al. |
| 8,503,703 B2 | 8/2013 | Eaton et al. |
| 8,571,247 B1 | 10/2013 | Oezer |
| 8,718,306 B2 | 5/2014 | Gommel et al. |
| 8,798,301 B2 | 8/2014 | Shennib |
| 9,031,247 B2 | 5/2015 | Shennib |
| 9,060,233 B2 | 6/2015 | Shennib et al. |
| 9,078,075 B2 | 7/2015 | Shennib et al. |
| 9,107,016 B2 | 8/2015 | Shennib |
| 9,219,966 B2 * | 12/2015 | Wang ............... H04W 4/02 |
| 9,326,706 B2 | 5/2016 | Shennib |
| 9,439,008 B2 | 9/2016 | Shennib |
| 9,918,171 B2 | 3/2018 | Shennib |
| 10,045,128 B2 | 8/2018 | Shennib |
| 2001/0008560 A1 | 7/2001 | Stonikas et al. |
| 2001/0009019 A1 | 7/2001 | Armitage |
| 2001/0051775 A1 | 12/2001 | Rho |
| 2002/0015506 A1 | 2/2002 | Aceti et al. |
| 2002/0027996 A1 | 3/2002 | Leedom et al. |
| 2002/0054689 A1 * | 5/2002 | Zhang ............... H04R 25/70 381/312 |
| 2002/0085728 A1 | 7/2002 | Shennib et al. |
| 2003/0007647 A1 | 1/2003 | Nielsen et al. |
| 2003/0078515 A1 | 4/2003 | Menzel et al. |
| 2004/0028250 A1 | 2/2004 | Shim |
| 2004/0073136 A1 | 4/2004 | Thornton et al. |
| 2004/0136555 A1 | 7/2004 | Enzmann |
| 2004/0165742 A1 | 8/2004 | Shennib et al. |
| 2005/0094822 A1 | 5/2005 | Swartz |
| 2005/0190938 A1 | 9/2005 | Shennib et al. |
| 2005/0226447 A1 | 10/2005 | Miller, III |
| 2005/0245991 A1 | 11/2005 | Faltys et al. |
| 2005/0249370 A1 | 11/2005 | Shennib et al. |
| 2005/0259829 A1 | 11/2005 | Van den Heuvel et al. |
| 2005/0259840 A1 | 11/2005 | Gable et al. |
| 2005/0283263 A1 | 12/2005 | Eaton et al. |
| 2006/0094981 A1 | 5/2006 | Camp |
| 2006/0210090 A1 | 9/2006 | Shennib |
| 2006/0210104 A1 | 9/2006 | Shennib et al. |
| 2006/0291683 A1 | 12/2006 | Urso et al. |
| 2007/0019834 A1 | 1/2007 | Nielson |
| 2007/0071265 A1 | 3/2007 | Leedom et al. |
| 2007/0076909 A1 | 4/2007 | Roeck et al. |
| 2007/0189545 A1 | 8/2007 | Geiger et al. |
| 2007/0237346 A1 | 10/2007 | Fichtl et al. |
| 2008/0240452 A1 | 10/2008 | Burrows et al. |
| 2008/0273726 A1 | 11/2008 | Yoo et al. |
| 2010/0040250 A1 | 2/2010 | Gerbert |
| 2010/0119094 A1 | 5/2010 | Sjursen et al. |
| 2010/0145411 A1 | 6/2010 | Spitzer |
| 2010/0191143 A1 | 7/2010 | Ganter |
| 2010/0226520 A1 | 9/2010 | Feeley et al. |
| 2010/0239112 A1 | 9/2010 | Howard et al. |
| 2010/0268115 A1 | 10/2010 | Wasden et al. |
| 2010/0284556 A1 | 11/2010 | Young |
| 2011/0009770 A1 | 1/2011 | Margolis et al. |
| 2011/0058697 A1 | 3/2011 | Shennib et al. |
| 2011/0176686 A1 | 7/2011 | Zaccaria |
| 2011/0188689 A1 | 8/2011 | Beck et al. |
| 2011/0190658 A1 | 8/2011 | Sohn et al. |
| 2011/0200216 A1 | 8/2011 | Lee et al. |
| 2011/0206225 A1 | 8/2011 | Møller et al. |
| 2012/0051569 A1 | 3/2012 | Blamey et al. |
| 2012/0095528 A1 | 4/2012 | Miller, III et al. |
| 2012/0130271 A1 | 5/2012 | Margolis et al. |
| 2012/0177212 A1 | 7/2012 | Hou et al. |
| 2012/0177235 A1 | 7/2012 | Solum |
| 2012/0183164 A1 | 7/2012 | Foo et al. |
| 2012/0183165 A1 | 7/2012 | Foo et al. |
| 2012/0189140 A1 * | 7/2012 | Hughes ............... H04M 3/56 381/123 |
| 2012/0213393 A1 | 8/2012 | Foo et al. |
| 2012/0215532 A1 | 8/2012 | Foo et al. |
| 2012/0285470 A9 | 11/2012 | Sather et al. |
| 2012/0288107 A1 | 11/2012 | Lamm et al. |
| 2012/0302859 A1 | 11/2012 | Keefe |
| 2013/0010406 A1 | 1/2013 | Stanley |
| 2013/0177188 A1 * | 7/2013 | Apfel ............... H04R 25/558 381/315 |
| 2013/0182877 A1 | 7/2013 | Angst et al. |
| 2013/0223666 A1 | 8/2013 | Michel et al. |
| 2013/0243209 A1 | 9/2013 | Zurbruegg et al. |
| 2013/0243227 A1 * | 9/2013 | Kinsbergen ......... H04M 1/2475 381/314 |
| 2013/0243229 A1 | 9/2013 | Shennib et al. |
| 2013/0294631 A1 | 11/2013 | Shennib et al. |
| 2014/0003639 A1 | 1/2014 | Shennib et al. |
| 2014/0150234 A1 | 6/2014 | Shennib et al. |
| 2014/0153761 A1 | 6/2014 | Shennib et al. |
| 2014/0153762 A1 | 6/2014 | Shennib et al. |

(56) References Cited

U.S. PATENT DOCUMENTS

| | | |
|---|---|---|
| 2014/0254843 A1 | 9/2014 | Shennib |
| 2014/0254844 A1 | 9/2014 | Shennib |
| 2015/0023512 A1 | 1/2015 | Shennib |
| 2015/0023534 A1 | 1/2015 | Shennib |
| 2015/0023535 A1 | 1/2015 | Shennib |
| 2015/0025413 A1 | 1/2015 | Shennib |
| 2015/0215714 A1 | 7/2015 | Shennib et al. |
| 2015/0256942 A1 | 9/2015 | Kinsbergen et al. |
| 2016/0066822 A1 | 3/2016 | Shennib et al. |
| 2016/0080872 A1 | 3/2016 | Shennib et al. |
| 2016/0166181 A1 | 6/2016 | Shennib |
| 2016/0198271 A1 | 7/2016 | Shennib |
| 2016/0337770 A1 | 11/2016 | Shennib |

FOREIGN PATENT DOCUMENTS

| | | |
|---|---|---|
| KR | 100955033 B1 | 4/2010 |
| KR | 1020100042370 A | 4/2010 |
| WO | 99/07182 A2 | 2/1999 |
| WO | 2010/091480 A1 | 8/2010 |
| WO | 2011128462 A2 | 10/2011 |
| WO | 2015009559 A1 | 1/2015 |
| WO | 2015009561 A1 | 1/2015 |
| WO | 2015009564 A1 | 1/2015 |
| WO | 2015009569 A1 | 1/2015 |
| WO | 2016044178 A1 | 3/2016 |

OTHER PUBLICATIONS

"Basic Guide to In Ear Canalphones", Internet Archive, Head-Fi. org, Jul. 1, 2012. Retrieved from http://web.archive.org/web/20120701013243/http:www.head-fi.org/a/basic-guide-to-in-ear-canalphones> on Apr. 14, 2015.

"dB HL—Sensitivity to Sound—Clinical Audiograms", Internet Archive, AuditoryNeuroscience.com, Apr. 20, 2013. Retrieved from <https://web.archive.org/web/20130420060438/http://www.auditoryneuroschience.com/acoustics/clinical_audiograms>on Apr. 14, 2015.

"Lyric User Guide", http://www.phonak.com/content/dam/phonak/b2b/C_M_tools/Hearing_Instruments/Lyric/documents/02-gb/Userguide_Lyric_V8_GB_FINAL_WEB.pdf, Jul. 2010.

"Methods for Calculation of the Speech Intelligibility Index", American National Standards Institute, Jun. 6, 1997.

"Specification for Audiometers", American National Standards Institute, Nov. 2, 2010.

"The Audiogram", Internet Archive, ASHA.org, Jun. 21, 2012. Retrieved from <https:/web.archive.org/web/20120621202942/http://www.asha.org/public/hearing/Audiogram> on Apr. 14, 2015.

"User Manual—2011", AMP Personal Audio Amplifiers.

Abrams, , "A Patient-adjusted Fine-tuning Approach for Optimizing the Hearing Aid Response", The Hearing Review, Mar. 24, 2011, 1-8.

Amlani, et al., "Methods and Applications of the Audibility Index in Hearing Aid Selection and Fitting", Trends in Amplication 6.3 (2002) 81. Retrieved from <https://www.ncbi.nim.nih.gov/pmc/articles/PMC4168961/> on Apr. 14, 2015.

ASHA, "Type, Degree, and Configuration of Hearing Loss", American Speech-Language-Hearing Association; Audiology Information Series, May 2011, 1-2.

Convery, et al., "A Self-Fitting Hearing Aid: Need and Concept", http://tia.sagepubl.com, Dec. 4, 2011, 1-10.

Franks, "Hearing Measurements", National Institute for Occupational Safety and Health, Jun. 2006, 183-232.

Kiessling, "Hearing aid fitting procedures—state-of-the-art and current issues", Scandinavian Audiology vol. 30, Suppl 52, 2001, 57-59.

Kryter, "Methods for the calculation and use of the articulation index", The Journal of the Acoustical Society of America 34.11 (1962): 1689-1697. Retrieved from <http://dx.doi.org/10.1121/1.1909094> on Aug. 27, 2015.

Nhanes, "Audiometry Procedures Manual", National Health and Nutrition Examination Survey, Jan. 2003, 1-105.

Sindhusake, et al., "Validation of self-reported hearing loss. The Blue Mountains hearing study", International Journal of Epidemiology 30.6 (2001 ): 1371-1378. Retrieved from <http://ije.oxfordjournals.org/content/30/6/1371.full> on Aug. 27, 2015.

Traynor, "Prescriptive Procedures", www.rehab.research.va.gov/mono/ear/traynor.htm, Jan. 1999, 1-16.

World Health Organization, , "Deafness and Hearing Loss", www.who.int/mediacentre/factsheets/fs300/en/index.html, Feb. 2013, 1-5.

\* cited by examiner

REMOTE VERIFICATION OF HEARING DEVICE FOR E-COMMERCE TRANSACTION

CROSS-REFERENCE TO RELATED APPLICATION(S)

This application claims the benefit under 35 U.S.C. 119 of the earlier filing date of U.S. Provisional Application No. 62/168,233 entitled "REMOTE VERIFICATION OF HEARING DEVICE STATUS FOR E-COMERCE TRANSACTION," filed May 29, 2015. The aforementioned provisional application is hereby incorporated by reference in its entirety, for any purpose.

This application is related to U.S. Pat. No. 8,467,556, titled, "CANAL HEARING DEVICE WITH DISPOSABLE BATTERY MODULE," filed on Sep. 9, 2010; U.S. Pat. No. 8,855,345, titled "BATTERY MODULE FOR PERPENDICULAR DOCKING INTO A CANAL HEARING DEVICE," filed on Mar. 19, 2012; and U.S. Pat. No. 9,107,016, titled, "INTERACTIVE HEARING AID FITTING SYSTEM AND METHODS," filed on Aug. 27, 2013; and U.S. Pending patent application Ser. No. 14/011,607, titled "ONLINE HEARING AID FITTING SYSTEM AND METHODS FOR NON-EXPERT USER," filed on Aug. 27, 2013; Ser. No. 14/990,650, titled "HEARING DEVICE TEST SYSTEM FOR NON-EXPERT USER AT HOME AND NON-CLINICAL SETTINGS," filed on Jan. 7, 2016; and 62/274,896, titled "BILLING METHOD FOR A RECHARGEABLE HEARING DEVICE BASED ON CHARGE USAGE," filed on Jan. 5, 2016; all of which are incorporated herein by reference in their entirety for any purpose.

TECHNICAL FIELD

Examples described herein relate to hearing devices, and more particularly methods and systems for remote verification of a hearing device.

BACKGROUND

An e-commerce transaction may be conducted by a hearing device user and a provider using the Internet. The user may purchase hearing aid related products and services by performing the e-commerce transaction. The provider may approve an e-commerce transaction after performing various remote verifications, such as a verification of the user's device. Performing the verification may be important so as to allow the provider to recommend compatible parts and/or prevent fraud or misuse.

Support services, such as sales support or technical support, may be provided by a manufacturer over the phone or the Internet. Support personnel typically request information before providing support. For certain technical support tasks, support personnel may request the user to perform a series of operations and report the results in order to provide the support remotely.

The performance of a hearing aid typically changes due to degradation of components over time. Performance and calibration checks for hearing aids are typically performed by professionals in clinical settings using specialized test instruments, such as a hearing aid analyzer. These specialized test instruments are cumbersome due to size, cost, and nuances unneeded in the consumer environment. The specialized test instruments are generally not available nor usable in the consumer environment. Hearing aid analyzers or calibration checkers for home use have been disclosed. However, these systems suffer from similar issues related to size, cost, and complexity. Thus, these testers, with methods and processes associated thereto, are generally not suitable for administration by a hearing aid user in the consumer environment.

BRIEF DESCRIPTION OF THE DRAWINGS

The above and still further objectives, features, aspects and attendant advantages of the present invention will become apparent from the following detailed description of certain preferred and alternate embodiments and method of manufacture and use thereof, including the best mode presently contemplated of practicing the invention, when taken in conjunction with the accompanying drawings, in which.

DETAILED DESCRIPTION

Certain details are set forth below to provide a sufficient understanding of embodiments of the invention. Some embodiments, however, may not include all details described. In some instances, well-known structures may not be shown in order to avoid unnecessarily obscuring the described embodiments of the invention.

The present disclosure describes methods and systems for remote verification of a remotely accessible hearing device. A hearing aid manufacturer or provider may wish to perform a transaction remotely or provide support services upon a verification of a hearing device. The hearing device may be verified by checking whether the hearing device exists or passes certain identification, functional, and/or performance criteria. A remote verification system according to examples disclosed herein may facilitate an e-commerce transaction or a support service. The online remote verification system disclosed herein allows the provider to verify a status and/or functionality of the hearing device prior to approving the e-commerce transaction or providing the support services. The remote verification system empowers non-expert consumers to purchase or obtain hardware, accessories, features, software, and/or services for their hearing device outside a clinical setting, such as a home, an office, a nursing home, a retail store, a pharmacy, etc. generally without resorting to professional assistance.

In some examples, the status and/or functionality of the hearing device may include a calibration check of the hearing device. The calibration of the hearing device may be checked automatically without resorting to sending the hearing device to the manufacturer or a service center for calibration or calibration check. In some examples, the status and/or functionality of the hearing device may include identification information associated with the hearing device, such as a serial number or user identification/credentials. The identification information may be checked automatically without manual input or professional assistance. In some examples, the status and/or functionality of the hearing device may be a read and/or write ability from/to a memory of the hearing device.

Figure 1:
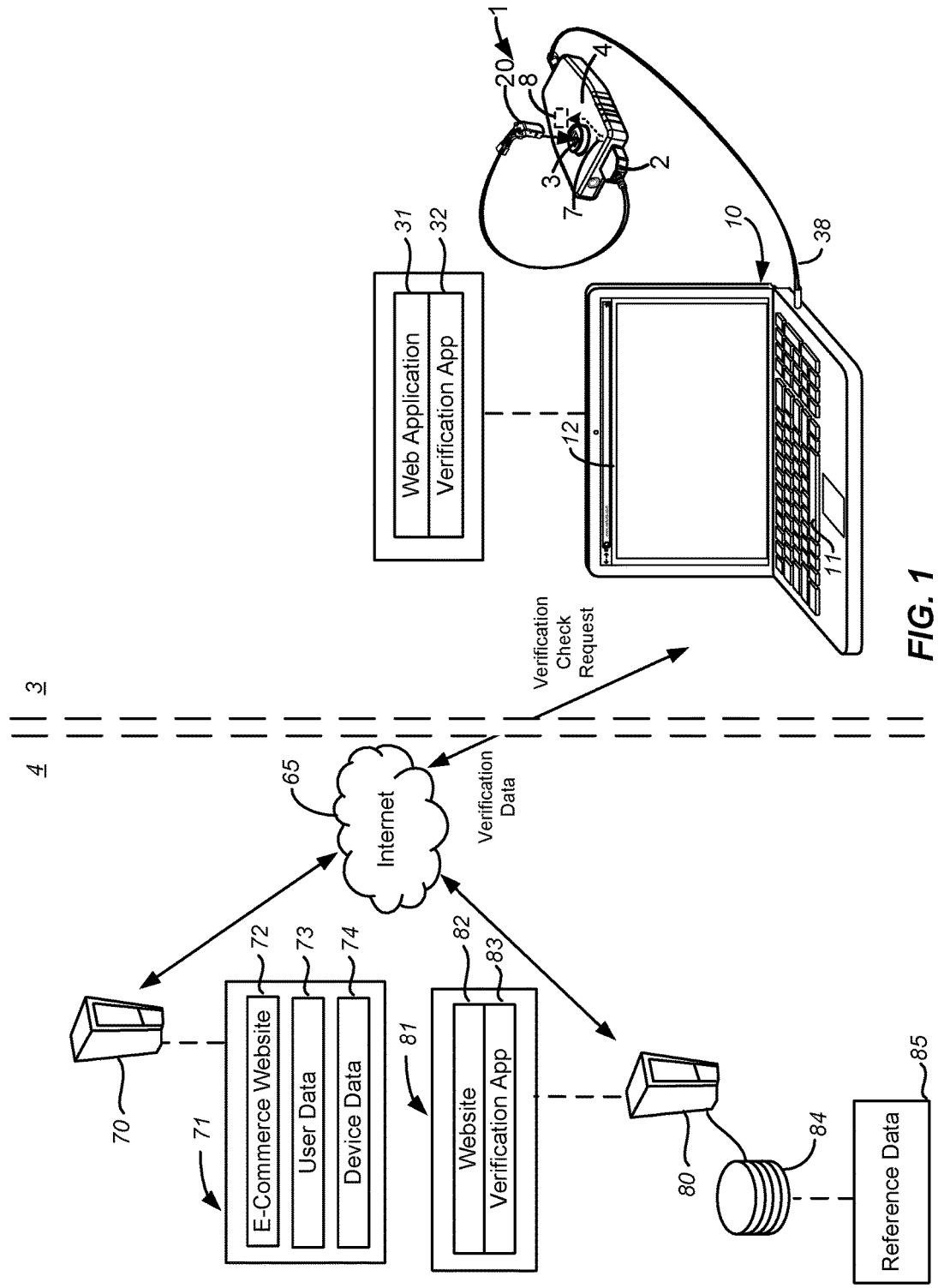
FIG. 1 is a schematic view of a remote verification system for verification of a hearing device including a remote server, a personal computing device (i.e. a personal computer, smartphone, etc.), and a portable test unit, according to some examples.

FIG. 1 is a schematic view of a remote verification system for a hearing device including a remote server communicatively coupled to a computing device 10 (i.e. a personal computer or a smartphone 13) and the hearing device 20. The remote verification system may include an e-commerce server 70 and/or a remote server 80 on a remote side 4. Although the e-commerce server 70 and the remote server 80 are shown as separate, those skilled in the art will appreciate that there can be a single computer system (FIG. 2) that performs these functions or there can be several computer systems arranged in a central or distributed fashion to perform these functions (FIG. 1). It is understood that virtually any number of intermediary networking devices, such as switches, routers, servers, etc. may be used to facilitate communication.

The remote verification system may include a computing device 10 and a hearing device 20 on a client side 3. In some examples, the hearing device 20 may be communicatively coupled to the computing device 10 by a wired connection or a wireless connection. In some examples, the hearing device 20 may be communicatively coupled to the computing device 10 via a portable test unit 1.

The remote verification system may be implemented as part of an e-commerce platform 71. The e-commerce platform 71 may facilitate a transaction between a provider and a consumer. The e-commerce platform 71 may include an e-commerce website 72, user data 73, device data 74, and/or any other data or services to perform a transaction for a hearing device user over the Internet 65. The transaction may include a purchase of hardware, software, features, and/or a service associated with the hearing device 20. It will be understood that a purchase may include, but is not limited to, a monetary purchase. For example, purchase in exchange for currency and/or for credits, points, or free of charge. Hardware associated with the hearing device 20 may include accessories, ear tips, and/or batteries. Software associated with the hearing device 20 may include programming software, hearing test software, and/or tuning profiles. Features associated with the hearing device 20 may include wireless services or programming credits. Services associated with the hearing device 20 may include warranties, protection plans, and/or support plans for the hearing device 20.

It may be advantageous for the e-commerce platform 71 to determine a status and/or functionality of the hearing device 20 prior to approving and performing an e-commerce transaction. The e-commerce platform 71 may use the status and/or functionality of the hearing device 20 to present a set of items for sale to the consumer and/or approve a transaction. In some examples, the consumer may be eligible to purchase a set of eligible items. The eligible items may include items compatible with the consumer's hearing device 20. In some examples, the consumer may attempt to complete a transaction in which one or more items require a verification of the status and/or functionality of the hearing device 20. The e-commerce platform 71 may approve the transaction after verifying the status and/or functionality of the hearing device 20.

The status of the hearing device 20 may include identification information (e.g., identification data 26) of the hearing device 20 and/or a user associated with the hearing device 20. The identification information of the hearing device 20 may include a serial number assigned to the hearing device 20 by the manufacturer. The identification information of the consumer associated with the hearing device 20 may include user account information, customized settings of the user or the hearing device 20.

The identification information of the hearing device 20 may be used to retrieve additional information about the hearing device 20, such as a model number of the hearing device 20, a user name registered to the hearing device 20, items or services for sale that are compatible with the hearing device 20. Being able to retrieve the identification information may verify that the hearing device 20 is eligible for and/or functional and able to power on. In some examples, the identification information may be used to provide support information, such as hearing loss data, hearing aid fitting data, order history, or targeted marketing data associated with the user.

The functionality of the hearing device 20 may include hardware and/or software performance of the hearing device 20. The hardware performance may include acoustical performance and/or memory function. The acoustical performance may include electroacoustic and/or a calibration characteristics of the hearing device 20. Memory performance may include the ability to read or write to memory of the hearing device 20. Software performance may include ability to execute and/or access software of the hearing device 20.

The functionality of the hearing device 20 may be used to verify that the hearing device 20 is functioning properly or to determine a capability of the hearing device 20. A properly functioning hearing device 20 may be required for certain transactions or to provide a support service. For example, a manufacturer may wish to add a warranty service and/or protection plan to an existing user of a hearing device 20 after the initial sale. The provider may further wish to provide a warranty service and/or protection plan only for a hearing device 20 that is functioning properly at the time of request for purchase of the warranty service and/or protection plan. In some examples, the e-commerce platform 71 may verify the functionality of the hearing device 20 prior to offering the warranty service and/or protection plan to a user. In some examples, the e-commerce platform 71 may automatically verify the functionality of the hearing device 20 while conducting a transaction, for example during a checkout process. If the functionality of the hearing device 20 is verified, the transaction may be approved. If the functionality of the hearing device 20 is not verified, the transaction may be denied.

The e-commerce platform 71 may be hosted by an e-commerce server 70 provided on a remote side 4. The e-commerce server 70 may be accessible via a communications network 65, such as the Internet. The e-commerce platform 71 may include an e-commerce website 72. The e-commerce website 72 may present a user interface 31 for conducting e-commerce transactions. For example, a user on a client side 3 may use a personal computing device 10 also on the client side 3 to access the e-commerce website 71 via the Internet.

The e-commerce server 70 may be communicatively coupled to a remote server 80 for verification of a hearing device 20. The remote server 80 may be provided on the remote side 4. The remote server 80 may be accessible via a communications network 65, such as the Internet. The remote server 80 may include a verification platform 81. The verification platform may include a website 82 and/or a verification app 83. A server, such as the e-commerce server 70, or a client device may access the verification platform 81 for a verification of the hearing device 20.

The remote server 80 may be communicatively coupled to a remote database 84 on the remote side 4. The remote database 84 may include reference data 85 for verification of the hearing device 20. The reference data 85 may include entries associated with the hearing device 20, such as serial numbers, user account information, fitting parameters and/or calibration data. The entries may be used by the remote server 80 to perform a verification check of the hearing device 20. For example, entries from the remote database 84 may be compared with test results from test unit 1 or functionality data retrieved from the hearing device 20 to verify the hearing device 20.

The computing device 10 may be a personal computer, a smartphone 13, a tablet, or any other type of device with a processor 41 and memory 44 for executing an application. In some examples, the computing device 10 may include a display 42 for presenting a user interface 31 to the user. The computing device 10 may be provided on a client (user) side 3. The computing device 10 may include a network interface for accessing the remote server 80 and/or the e-commerce server 70 via the communications network 65. The computing device 10 may execute a web application 31 and/or a verification app 32 for performing a verification check using the verification platform 81. The web application 31 may be used to access the e-commerce website 72 or the verification website 82. The web application 31 may be used to execute the verification app 83. The web application 31 may be executed via a browser or executed as a standalone application with access to the Internet 65.

The computing device 10 may be communicatively coupled to a hearing device 20. The hearing device 20 may be a hearing aid (BTE, ITE, CIC, or any other type), a personal sound amplification product (PSAP), or any other type of sound delivery device worn by a consumer, in or around the ear. The hearing device 20 may include a sound processor 56, a speaker 57 and a microphone 59. In some examples, the hearing device 20 may be modular, including a lateral module and a main module. The lateral module may include a battery cell. The lateral module may partially or fully disengage from the main module. The hearing device 20 may be coupled to the computing device 10 via a wired or wireless interface. In some examples, the wired interface may include a USB connection. In some examples the wireless interface may include a Bluetooth connection.

Figure 2:
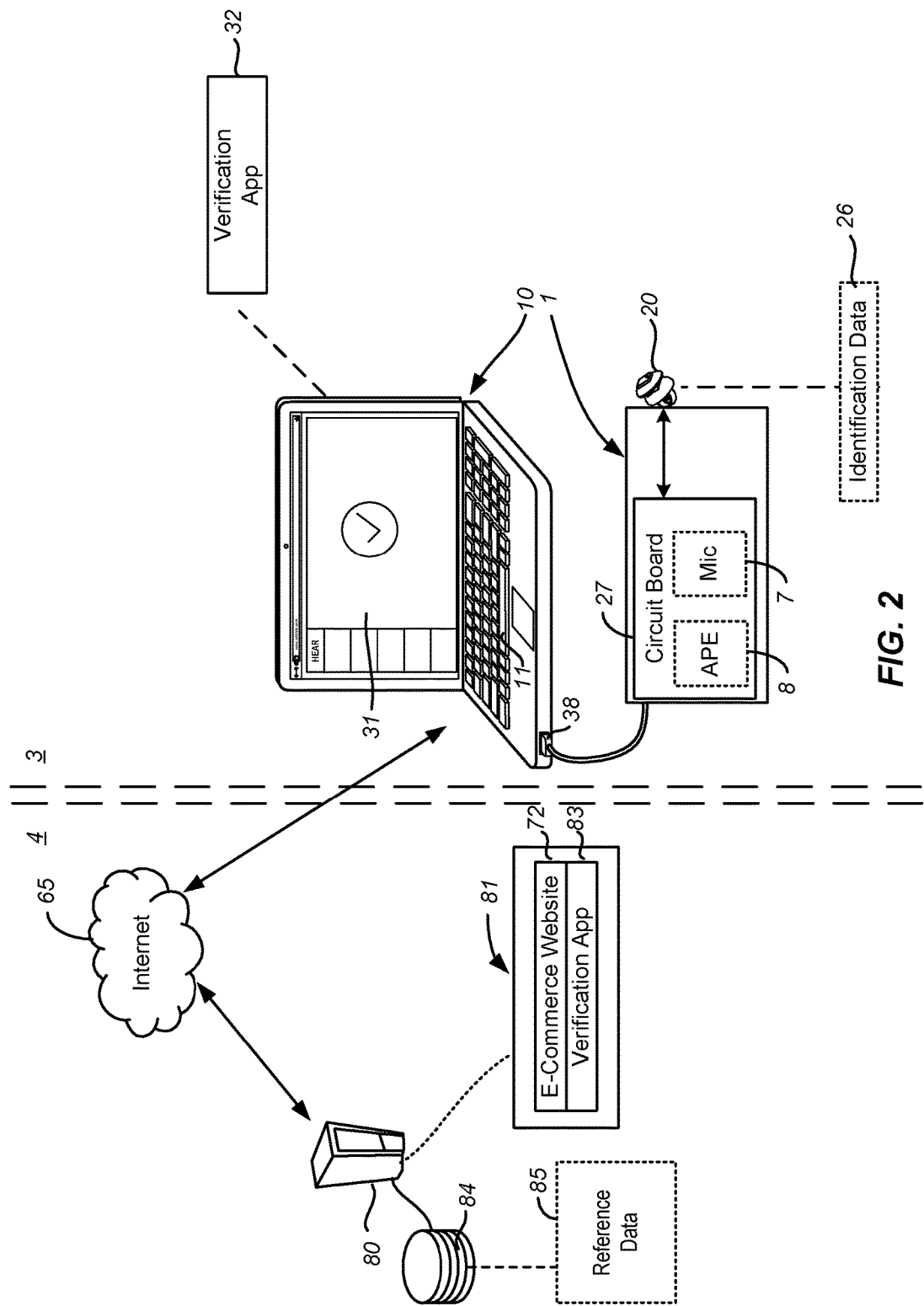
FIG. 2 is a schematic view of a remote verification system including a portable test unit for verifying a functionality of the hearing device, according to some examples.
Figure 12:
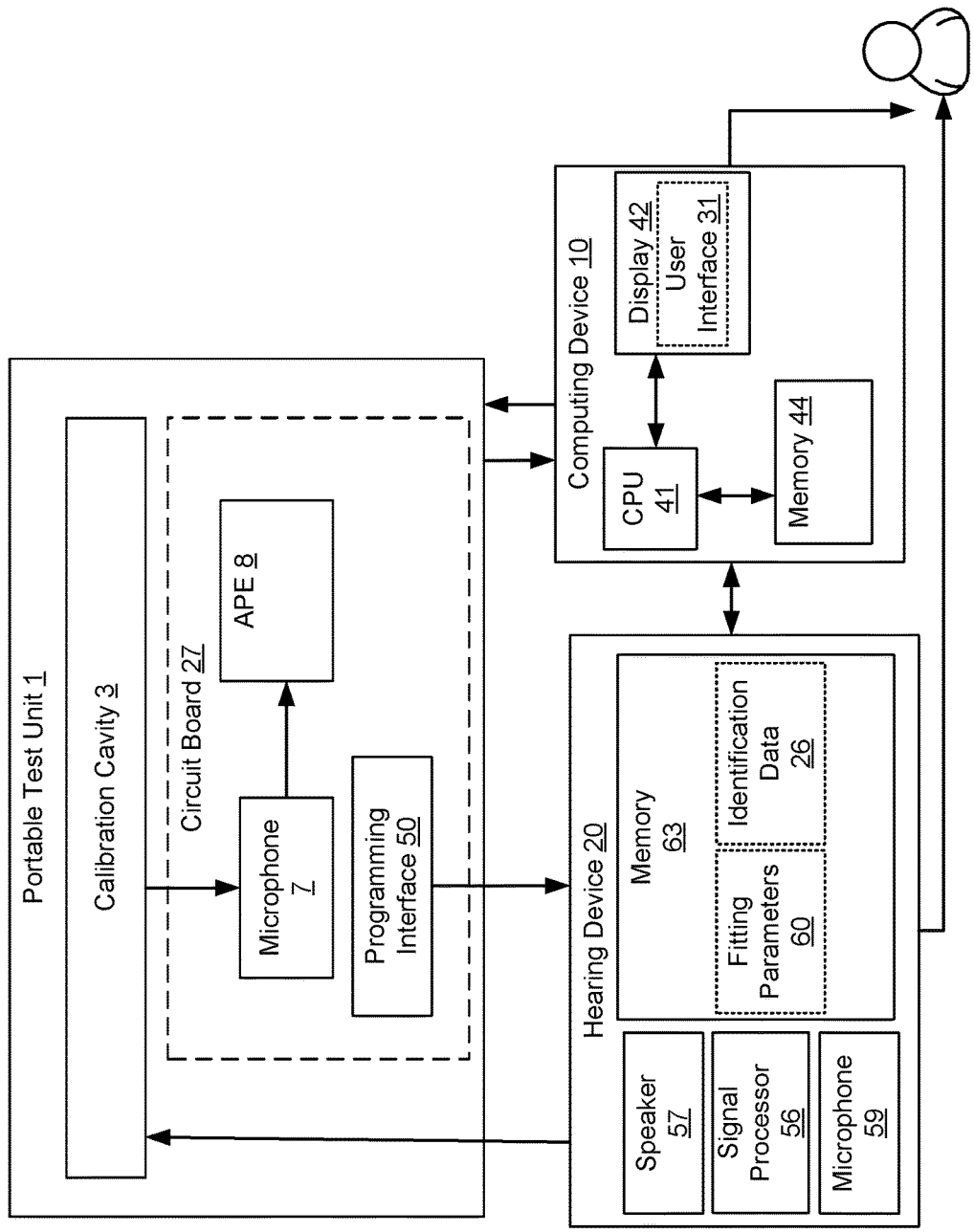
FIG. 12 is a block diagram of a hearing device test system according to examples of the present disclosure.

FIGS. 2 and 12 are schematic views of a remote verification system including a portable test unit 1 for verifying a functionality of the hearing device 20. In some examples, the portable test unit 1 may be handheld or wearable. In some examples, the portable test unit 1 may weigh less than 2 ounces.

The portable test unit 1 includes a circuit board 27 with a programming interface 50 for communicating with the hearing device 20. The circuit board 27 may include audio processing electronics 8 for performing an acoustic verification check. The circuit board 27 may include a microphone 7 for receiving acoustic signals from the hearing device 20. In some examples, the portable test unit 1 may be coupled with the computing device 10 for communication with a verification app 32 of the computing device 10 for performing the verification check.

The portable test unit 1 may be an intermediary device used to facilitate communication between the hearing device 20 and the computing device 10. The portable test unit 1 may include an acoustic calibration cavity 3 for acoustic coupling with the hearing device 20. The acoustic calibration cavity 3 may be provided along an external surface 4 of the portable test unit 1 for receiving acoustic stimuli from the hearing device 20. In some examples, the acoustic calibration cavity 3 may accommodate the hearing device 20 at least partially therein. In some examples, the portable test unit 1 comprises an adapter for accommodating the hearing device 20 within the acoustic calibration cavity 3. In some examples, the adapter may be configured to enable the hearing device 20 to be coupled to the acoustic calibration cavity 3 of the portable test unit 1.

In some examples, the medial end of the hearing device 20 may be positioned within the acoustic calibration cavity 3 or the adapter. In some examples, the speaker 57 of the hearing device 20 may be oriented towards a microphone 7 of the portable test unit 1. The microphone 7 of the portable test unit 1 may be provided within the acoustic calibration cavity 3 for receiving the acoustic calibration stimuli 55 during a calibration check or verification check in conjunction with an e-commerce transaction.

The portable test unit 1 may be communicatively coupled to the hearing device 20 via a programming interface 50 using a wired interface, which may include a programming cable, or a wireless interface, which may include Bluetooth. The portable test unit 1 may retrieve identification data 26 stored in a memory 63 of the hearing device 20. The identification data 26 stored in the memory 63 of the hearing device 20 may include the serial number, fitting parameters 60, and/or user information. The identification data 26 may be retrieved using a wired or wireless connection to the hearing device 20.

In some examples, the portable test unit 1 may be communicatively coupled to the computing device 10 using a wired connection 38, such as a USB connection. In some examples, the portable test unit 1 may be communicatively coupled to the computing device 10 using a wireless connection, such as Bluetooth. The computing device 10 or the portable test unit 1 may receive or generate a test signal request. The test signal request may include instructions indicative of verification parameters, such as what kind of verification is being requested. The computing device 10 and/or portable test unit 1 may communicate with the hearing device 20 for performing the verification check.

The computing device 10 may be in communication with a remote server 80 or an e-commerce server 70 for performing an e-commerce transaction. A user of the hearing device 20 may visit an e-commerce website 72 to perform the e-commerce transaction. The e-commerce web site 72 may provide a graphical user interface 31 through which the user may interact with the remote side 4, e.g., for performing an e-commerce transaction. In some examples, a verification check step may be performed as part of a checkout process facilitated by the e-commerce website 72. In some examples, a verification check step may be performed prior to presenting, via the e-commerce website 72, a service option or items for sale to the user. During the verification check step, a status and/or a functionality of the hearing device 20 may be verified.

The computing device 10 may be in communication with a support computer 100 for providing support services. The support services may include sales support, technical support, or other customer support functions. A user of the hearing device 20 may be in communication with a customer support personnel 101 operating the support computer 100. Sales support may include selecting products or services that may be of interest to the user. Technical support may include verifying functionality, evaluating performance, or ensuring proper use of the products. Support may be automated and/or computer-based. In some examples, functions of the support computer 100 (e.g., support services) may be incorporated into and thereby provided by the remote server 80.

The computing device 10 may receive a verification check request from the remote server 80 or the support computer 100. The verification check request may be received while a user of the computing device 10 is browsing the e-commerce website and/or during a checkout process on the e-commerce website. The verification check request may be delivered to the computing device 10 by any of the remote server 80 or the support computer 100. The verification check request may include instructions for performing the verification check according to verification criteria. Verification criteria may include a calibration range, diagnostic criteria, hardware connection, identification data 26, and/or any other functionality or status of the hearing device 20.

The computing device 10 may execute a verification software application 32 for performing a verification check. The verification software application 32 may enable communication between the computing device 10 and the hearing device 20, e.g., during a verification check. In some examples, the verification software application 32 may provide a web-based user interface (also referred to as a web application 31) such as for receiving user inputs, displaying information to the user, or both, during a verification check. In some examples, operations of the verification software application 32 may run in the background without requiring user interaction and/or without the user being aware of the verification check(s) being performed. The verification software application 32 may communicate with a verification app 83 provided on the remote server 80. For example, while a user is browsing the e-commerce website 72, the e-commerce website 72 may initiate the verification app 83 to perform a verification check of the hearing device 20 while the user is browsing the e-commerce website 72 and/or attempting to conduct an e-commerce transaction.

During a verification check, verification data may be generated in response to the verification check request. The verification data may be generated by the computing device 10, the hearing device 20, or a combination of the two. In some examples, the verification data may include identification data 26, for example a serial number, retrieved from memory 63 of the hearing device 20. In some examples, the verification data may include a level of an output of a hearing device speaker 57. In some examples, the verification data may include an indication of whether the level of the output of the hearing device speaker 57 conforms to a verification criteria, for example whether the level of the output is within a valid calibration range.

A remote verification may be initiated when a verification check request is received by the computing device 10 or the hearing device 20. The computing device 10 may request the identification data 26 from the hearing device 20. Upon the hearing device 20 successfully delivering the identification data 26 to the computing device 10, verification data may be generated including the identification data 26 and/or an indication that verification was successful. The remote server 80 may receive the verification data from the computing device 10. The remote server 80 may compare the verification data to reference data 85 stored in a remote database 84 accessible to the remote server 80. If the hearing device 20 does not successfully deliver the identification data 26 to the computing device 10, verification data may be generated that indicates that the verification was unsuccessful. For example, if the hearing device 20 is out of communication range of the computing device 10, the identification data 26 may not be deliverable to the computing device and the verification may be unsuccessful.

In some examples, the verification check request may include a request for hearing device performance verification. The hearing device performance verification may include a check of memory 61, circuitry function, and/or performance checks of other components of the hearing device 20. The computing device 10 may perform the hearing device performance verification by delivering a verification check request to the hearing device 20. The verification check request may be delivered directly from the computing device 10 to the hearing device 20 or via the portable test unit 1. The verification check may be performed by a write step and a read step to verify the performance of the memory 63 of the hearing device 20. For example, if the hearing device 20 successfully performs the read step following the write step, verification data may be generated to indicate that the hearing device performance verification was successful.

In some examples, the verification check request may include a request for acoustic performance verification. The acoustic performance verification may include verifying that an output of the hearing device 20 is within a valid calibration range. The acoustic performance verification may include initiating a calibration check after placement of the hearing device 20 at least partially within the acoustic calibration cavity 3 of the portable test unit 1. The computing device 10 or the portable test unit 1 may detect the placement of the hearing device 20 at least partially within the acoustic calibration cavity 3 and automatically initiate the calibration check. In some examples, instructions may be provided to the user (e.g., via a user interface on the computing device) to place the hearing device 20 at least partially within the acoustic calibration cavity 3 and/or initiate the calibration check. When the hearing device 20 is accommodated within the acoustic calibration cavity 3, the speaker 57 of the hearing device 20 may provide an acoustic test stimuli 55 within the acoustic calibration cavity 3. The acoustic calibration cavity 3 may be configured with a controlled volume to produce a predetermined sound pressure level according to the acoustic test stimuli and the controlled cavity volume.

In some examples, the verification check request may include authentication data. The authentication data may include a passcode, for example a random alphanumeric sequence and/or an answer to a security question. The computing device 10 may receive the authentication data from the remote server 80 or generate the authentication data. The computing device 10 may deliver the authentication data to the hearing device 20. The hearing device 20 may present an audible authentication message representing the authentication data to an ear of a user wearing the hearing device 20 using speaker 57.

In some examples, the authentication data may be a random alphanumeric sequence, such as "A123." The computing device 10 may generate or relay the random alphanumeric sequence to the user and/or the hearing device. The computing device 10 may generate the random alphanumeric sequence by executing an authentication data generator. The computing device 10 may relay a random alphanumeric sequence received from a third party computer, such as a remote server 80. In some examples, the random alphanumeric sequence may be one or more random words.

A user authentication entry in response to the audible authentication message may be registered by the computing device 10. In some examples, the user may hear the audible authentication message from the speaker 57 of the hearing device 20 and may manually enter an authentication response using the computing device 10. The manually entered authentication response may be registered by the computing device 10. The user may manually enter the authentication response using a keyboard (or keypad) or touchscreen of the computing device 10. In some examples, the user may manually enter the authentication response by selecting an answer from a set of options presented in a user interface 31 displayed on the computing device 10. When presented with a set of options in the user interface 31, the user may use a mouse coupled to the computing device to select one or more of the options in an authentication response. In some examples, the user may enter a spoken authentication response after hearing the audible authentication message from the speaker 57 of the hearing device 20. The spoken authentication response may be registered by the computing device 10. The spoken authentication response from the user may be detected from a microphone of any of the hearing device 20 (e.g., microphone 59), computing device 10, or portable test unit 1 (e.g., microphone 7). The spoken response may be converted by speech recognition software for detection by computer system for authentication.

The computing device 10 may generate verification data based on the authentication data and/or the user authentication entry for authentication by the remote server 80. The user authentication response may be authenticated using a full match, a partial match, or a correct user selection. The verification data may be used to verify the hearing device 20 presence and/or function prior to performing an e-commerce transaction. In some examples, the user authentication entry may be delivered by the computing device 10 to a remote server 80. The remote server 80 may authenticate the user authentication entry prior to performing the e-commerce transaction.

The microphone 7 of the portable test unit 1 may be provided within the acoustic calibration cavity 3 for receiving the acoustic calibration stimuli, which may be generated by the hearing device 20 responsive to test signals 29 during a calibration check. In some examples, the microphone 7 may be provided at a bottom of the acoustic calibration cavity 3. During a calibration check or a calibration, the microphone 7 may produce a sensed calibration signal in response to receiving the acoustic calibration stimuli. The microphone 7 may deliver the sensed calibration signal to an audio processing electronics 8 (APE) of the portable test unit 1. The computing device 10 may receive the sensed calibration signal and/or a sensed calibration signal level. Verification data may be generated using the sensed calibration signal and/or the sensed calibration signal level. The verification data may include the sensed calibration signal level and/or a determination of whether the sensed calibration signal level is within a valid calibration range.

The remote server 80 or the support computer 100 may verify a status and/or a functionality of the hearing device 20 based on one or more verification criteria. The verification criteria may include authorized identification data, successful performance check, and/or calibration data that is within a calibration range. The verification criteria may include comparing status and/or functionality information obtained from the hearing device 20 with reference data 85. The reference data 85 may include information indicative of authorized identification data (e.g., reference serial numbers), reference performance levels, and/or reference calibration data. The hearing device 20 may be verified based on whether it passed the one or more of the verification criteria. For example, the hearing device 20 may be verified when the serial number of the hearing device 20 of a user is determined to be valid.

In some examples, testing of individual components of the hearing device 20 may be isolated and performed separately. For example, the speaker 57 and sound processing electronics of the hearing device 20 may be checked, e.g., by requesting delivery of an acoustic calibration stimuli from the hearing device 20 to a portable test unit 1. The microphone 59 of the hearing device 20 may be bypassed or disabled while the speaker 57 and sound processing electronics are being checked. A first signal level associated with the acoustic calibration stimuli in the acoustic calibration cavity may be measured by the calibration microphone 7 provided within the acoustic calibration cavity 3 (referred to herein as "calibration microphone"). A calibration of the hearing device speaker 57 may be validated by comparing the level of the first signal measured and a first reference level stored in a memory. The memory may be provided in the portable test unit 1, the hearing device 20, the computing device 10, the remote server 80, or any other device associated with the remote verification test system.

After verifying the hearing device 20, the user may be permitted to conduct an e-commerce transaction. As discussed above, the e-commerce transaction may include a purchase of hardware, software, features, and/or services associated with the hearing device 20.

Figure 3:
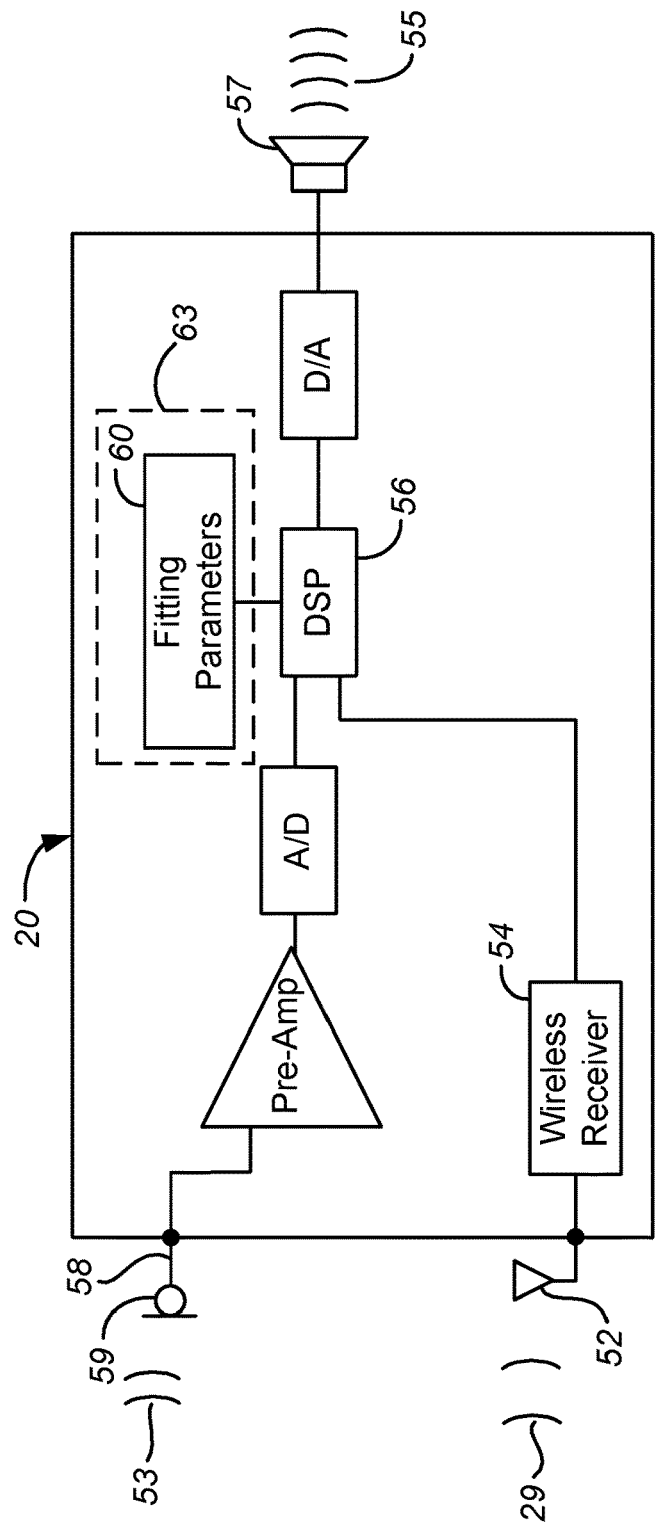
FIG. 3 is a block diagram of a hearing device, according to some examples.

FIG. 3 is a schematic view of a hearing device 20. The hearing device 20 may be a canal hearing device including a microphone 59, a pre-amp, analog-to-digital converter, sound processor 56, which may be a digital single processor (DSP), calibration signal generator, digital-to-analog converter, and speaker 57 incorporated therein. The microphone 59 of the hearing device 20 may receive acoustic signals 53 and generate an input signal 58. Responsive to the input signal 58, the signal processor 56 may generate an output signal using the fitting parameters 60. The speaker 57 of the hearing device 20 may deliver an acoustic output 55 based on the output signal.

The hearing device 20 may receive test signals from any of the portable test unit 1 and the computing device 10. The calibration signal generator 24 (see FIG. 5) of hearing device 20 may generate an acoustic output responsive to the test signals. The acoustic output 55 may be delivered to the ear of a user using the speaker 57 of the hearing device 20. The test signals may be non-acoustic inputs to the hearing device. For example, the hearing device 20 may receive the test signals 29 wirelessly using a wireless communication device (e.g., a wireless receiver 54 and an antenna 52).

Figure 4:
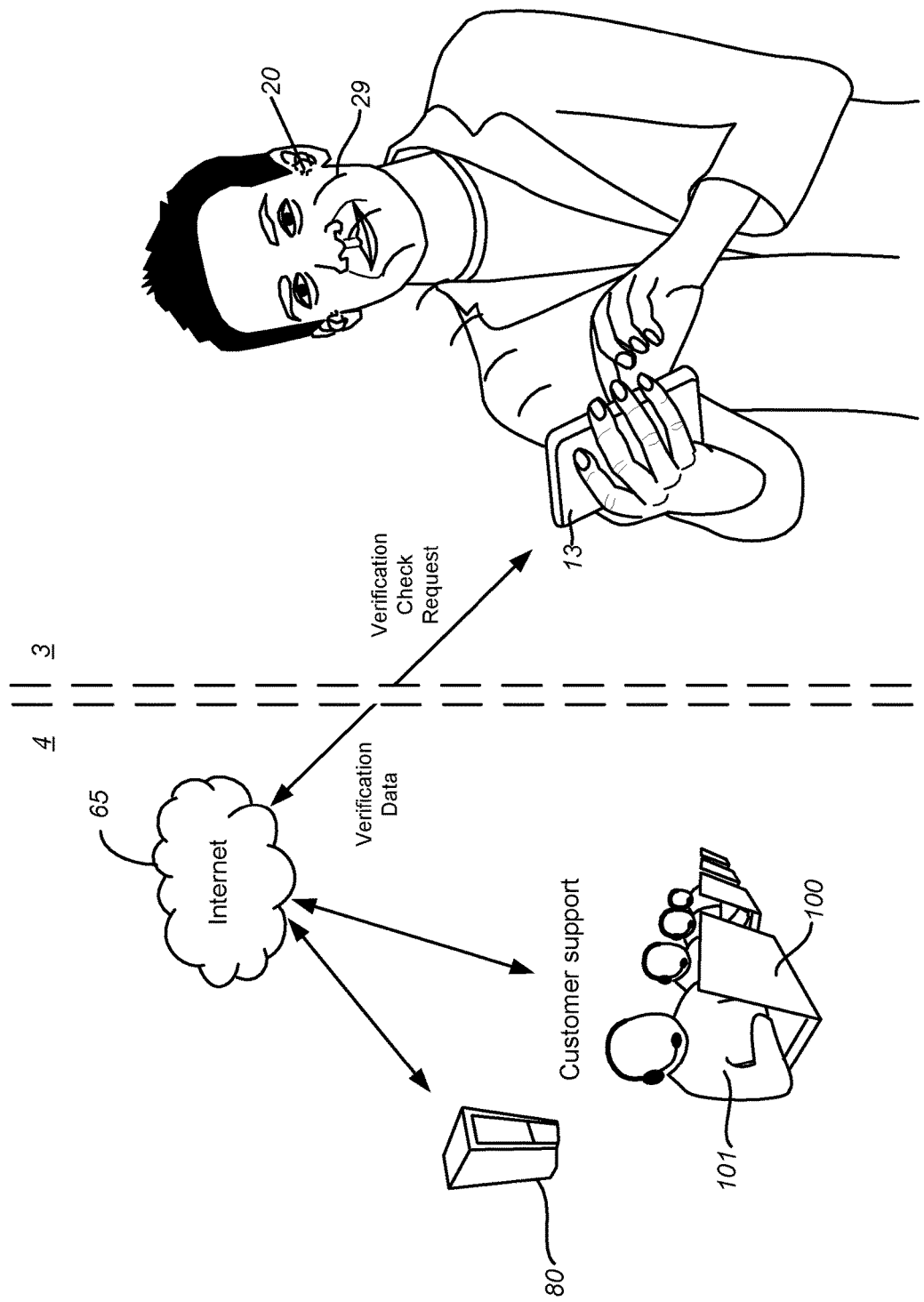
FIG. 4 is a schematic view of a remote verification system showing a hearing device in communication with a remote support computer, according to some examples.

FIG. 4 is a schematic view of a remote verification system showing a wireless hearing device 20 in communication with a remote server 80 and a customer support computing device 100 (also referred to herein as "support computer") via a network, for example the Internet 65. The customer support computing device 100 may be provided on the remote side 4. The customer support computing device 100 may be operated by a customer support personnel 101. The remote server 80 may receive a diagnostic check request from a customer support computing device 100. The diagnostic check may include a verification check of a status and/or functionality of the hearing device 20. The support personnel 101 may deliver a diagnostic check request in order to provide support to a user or enable an e-commerce transaction. The support personnel 101 may be able to ascertain desired information about the user and/or the hearing device 20, such as the serial number of the hearing device 20, user account information of the user, a calibration of the hearing device 20, and/or performance of the hearing device 20.

Upon receiving the diagnostic check request from the customer support computing device 100, the remote server 80 or the customer support computing device 100 may determine a status and/or a functionality of the hearing device 20 using the verification data and/or a verification criteria. The computing device 10 may be communicatively coupled to the hearing device 20 for delivery of the verification data or verification determination to the customer support computing device 100. In some examples, the customer support computing device 100 may execute a verification application to perform the verification of the hearing device 20.

The customer support computing device 100 may be implemented with a live chat feature on the e-commerce website 72, whereby a support personnel 101 may assist a user remotely. The customer support computing device 100 (e.g., automatically or via control by support personnel 101) may send a diagnostic check request to the hearing device 20.

Figure 5:
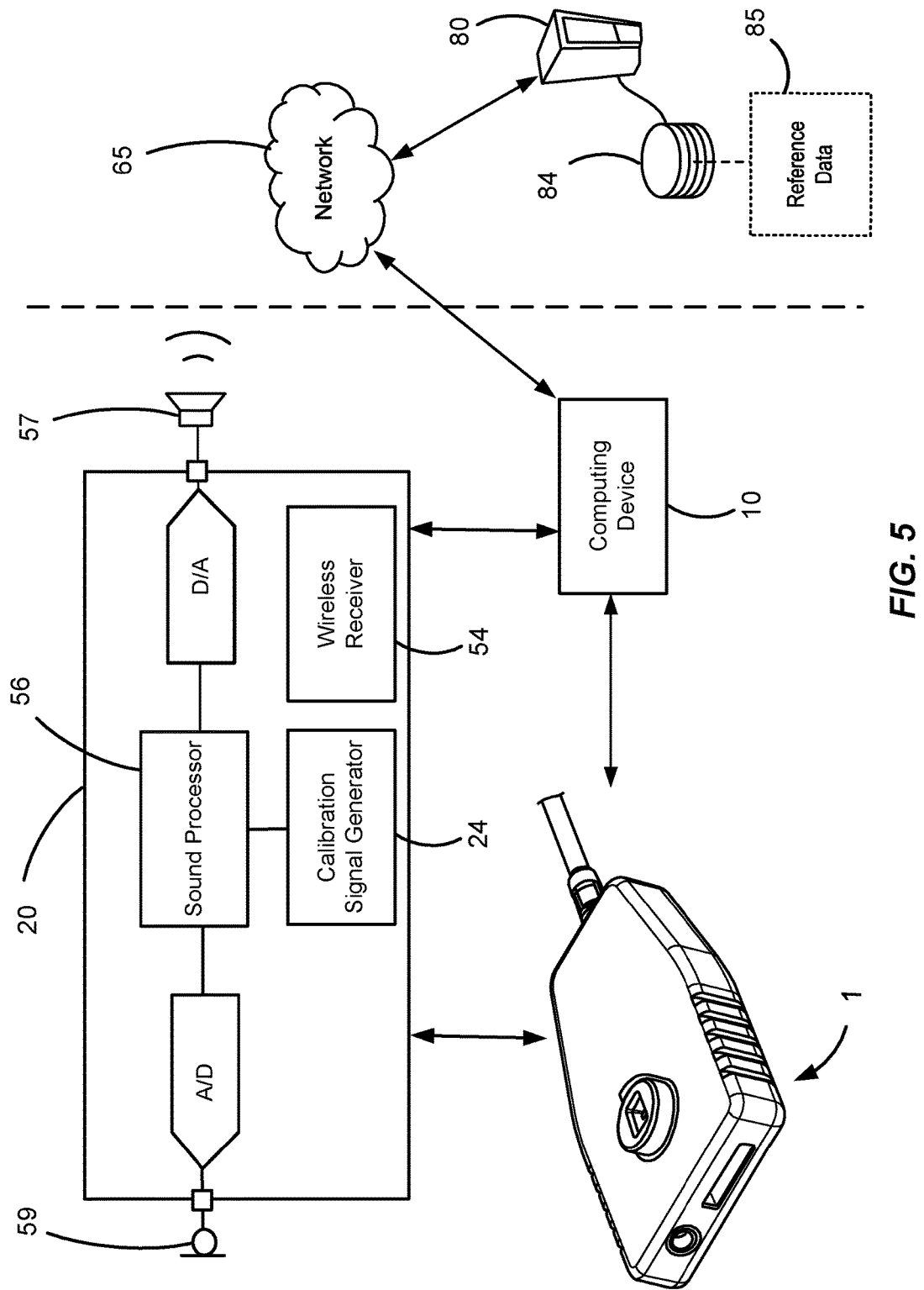
FIG. 5 is a schematic view of a remote verification system showing a hearing device adapted to communicate with a client computing device, and client portable test unit, according to some examples.

FIG. 5 is a schematic view of a remote verification system showing a hearing device 20 adapted to communicate directly or indirectly with a computing device 10. For certain types of verification checks, for example a calibration check, the portable test unit 1 may be utilized to perform the verification check. For other types of verification checks, such as verifying identification information of the hearing device 20, the portable test unit 1 may not be required, although in some examples the portable test unit may provide a wired connection between the hearing device 20 and computing device 10 during the verification check. When the portable test unit 1 is required, the hearing device 20 may be acoustically and/or communicatively coupled to the portable test unit 1. The portable test unit 1 may execute or relay instructions from the computing device 10 to control the hearing device 20 and detect acoustic signals using its microphone 7. The portable test unit 1 may deliver acoustic signal measurement data to the computing device 10. The computing device 10 may generate verification data based on the acoustic signal measurement data.

In some examples, the hearing device 20 may be communicatively coupled directly (i.e., without an intermediary device) to the computing device 10 over a wired or wireless interface to perform a transaction on an e-commerce website using the computing device 10. During the checkout process on the e-commerce website 72, a verification check of the hearing device 20 may be performed. At the verification check step, the verification app 32 may be executed to detect and initiate a verification of a hearing device 20 that may be wirelessly coupled to the computing device 10. In some examples, the hearing device 20 may be worn in an ear of the user while the verification check is performed. The hearing device 20 may perform tasks associated with the verification check, for example delivering identification data and/or performing read or write procedures, wirelessly. The computing device 10 may receive data associated with the verification check from the hearing device 20 and generate verification data in accordance with the data received from the hearing device 20.

FIGS. 6-11 are flow chart representations for remotely verifying a functionality of a hearing device, according to some examples. While the various steps in these flowcharts are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 6-11 should not be construed as limiting the scope of the invention.

Figure 6:
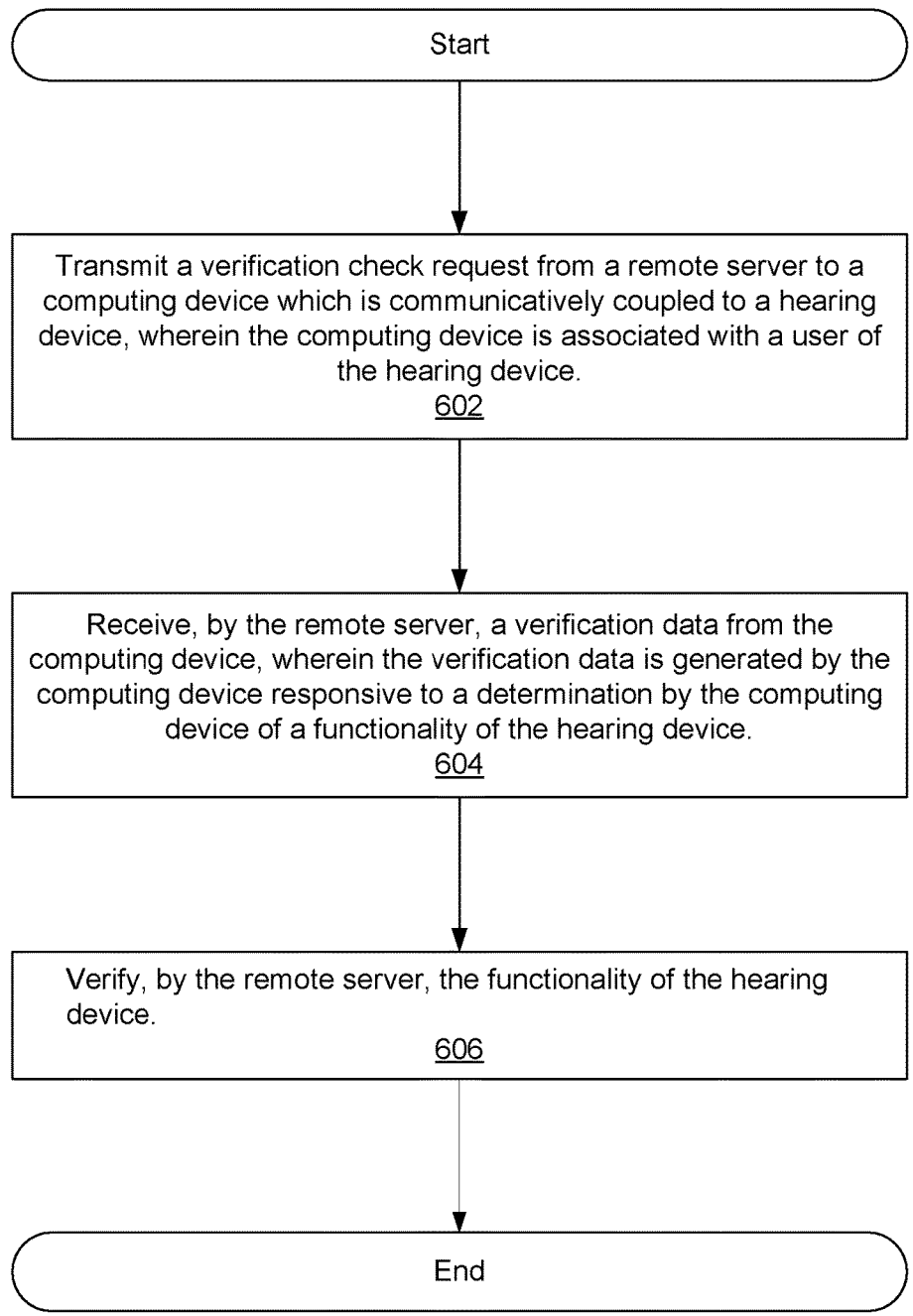
FIG. 6 is a flow chart representation for remotely verifying a functionality of a hearing device and performing an e-commerce transaction, according to some examples.

FIG. 6 is a flow chart representation for a method, according to some examples. In step 602, a verification check request from a remote server is transmitted to a computing device which is communicatively coupled to a hearing device, wherein the computing device is associated with a user of the hearing device. In step 604, a verification data is received by the remote server from the computing device, wherein the verification data is generated by the computing device responsive to a determination by the computing device of a functionality of the hearing device. In step 606, the functionality of the hearing device is verified by the remote server.

Figure 7:
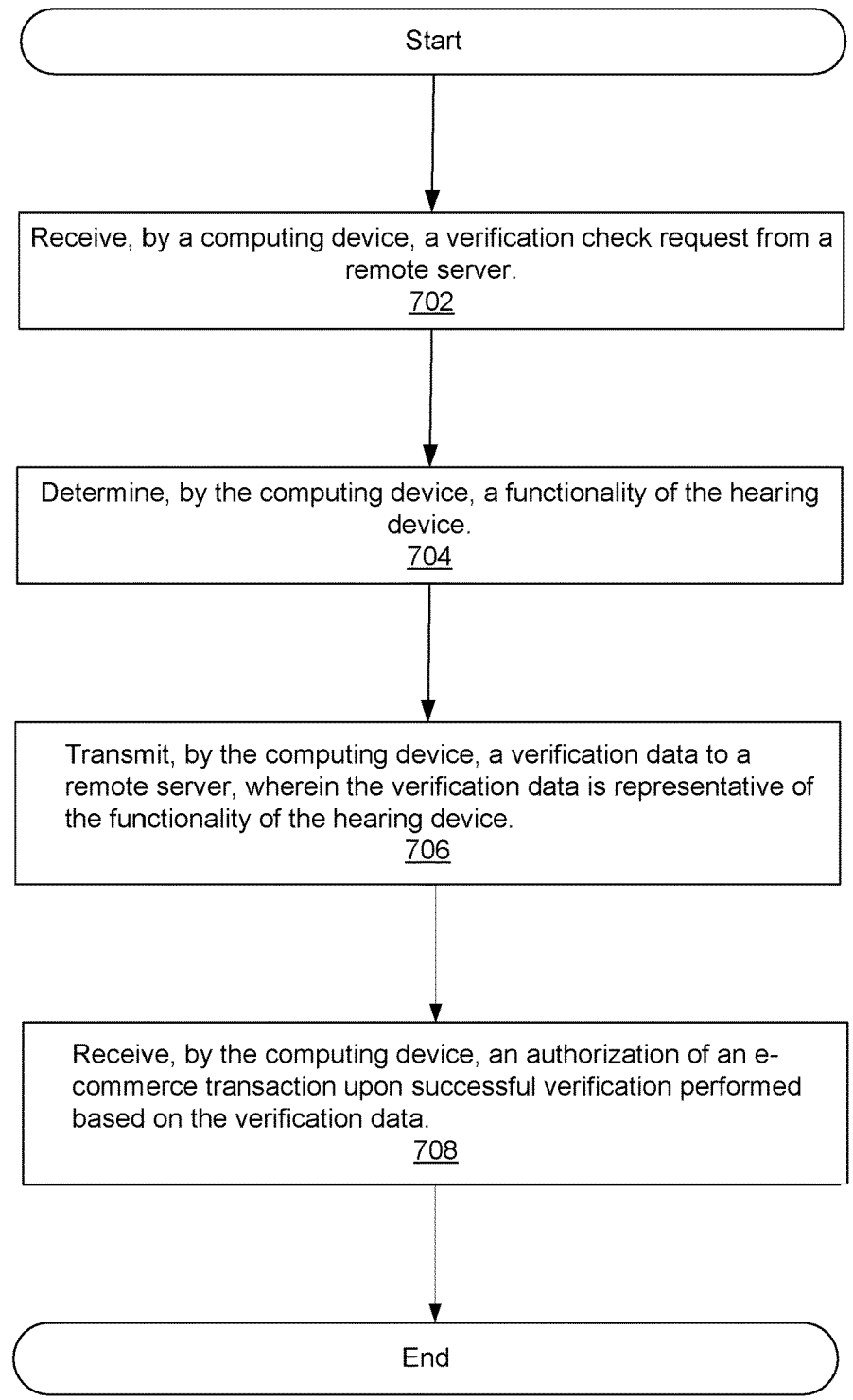
FIG. 7 is a flow chart representation for performing an e-commerce transaction for a hearing device, according to some examples.
Figure 8:
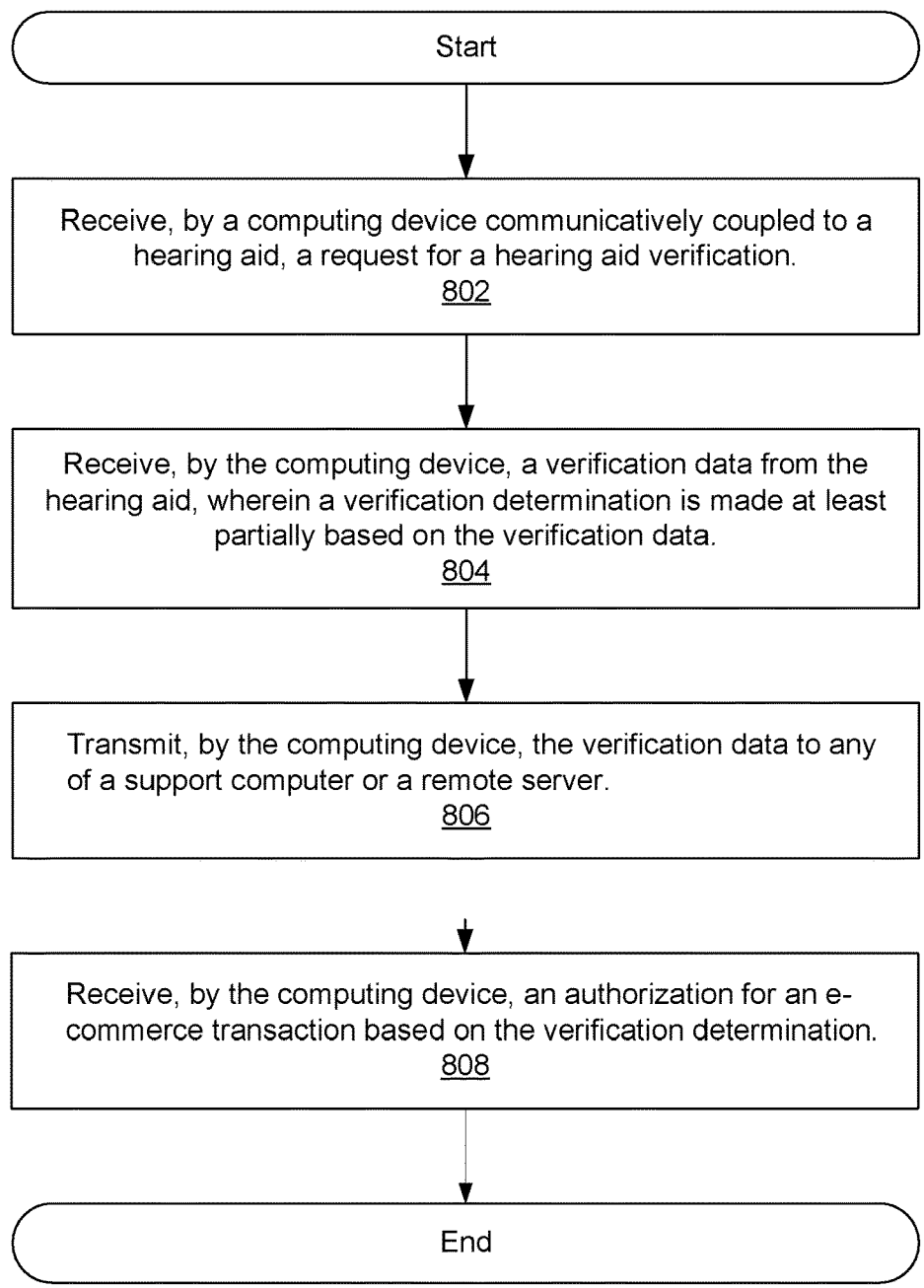
FIG. 8 is a flow chart representation for performing an e-commerce transaction for a hearing device after calibration check of the hearing device at the client side, according to some examples.

FIG. 7 is a flow chart representation for a method, according to some examples. In step 702, a verification check request is received from a computing device from a remote server. In step 704, a functionality of the hearing device is determined by the computing device. In step 706, a verification data is transmitted by the computing device to a remote server, wherein the verification data is representative of the functionality of the hearing device. In step 708, an authorization of an e-commerce transaction is received by the computing device upon successful verification performed based on the verification data FIG. 8 is a flow chart representation for providing customer support for a hearing aid user, according to some examples. In step 802, a request for a hearing aid verification is received by a computing device communicatively coupled to a hearing aid. In step 804, a verification data is received by the computing device from the hearing aid. The verification determination may be made at least partially based on the verification data. In step 806, the verification data is transmitted by the computing device to any of a support computer or a remote server. In step 808, an authorization for an e-commerce transaction is received by the computing device based on the verification determination.

Figure 9:
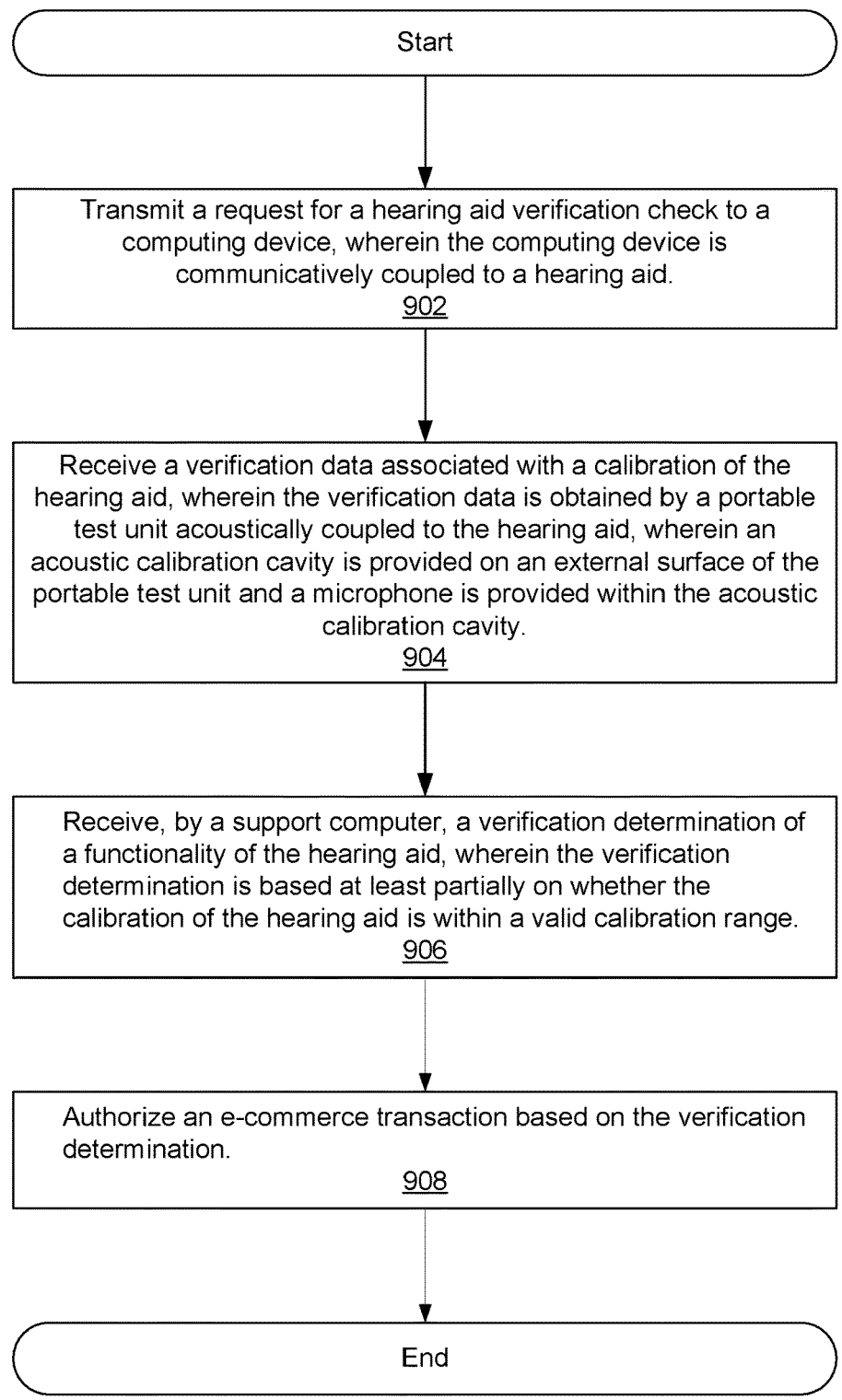
FIG. 9 is a flow chart representation for performing an e-commerce transaction for a hearing device, according to some examples.

FIG. 9 is a flow chart representation for providing customer support for a hearing aid user, according to some examples. In step 902, a request for a hearing aid verification check is transmitted to a computing device. The computing device may be communicatively coupled to a hearing aid. In step 904, a verification data associated with a calibration of the hearing aid is received. The verification data may be obtained by a portable test unit acoustically coupled to the hearing aid. An acoustic calibration cavity may be provided on an external surface of the portable test unit and a microphone may be provided within the acoustic calibration cavity. In step 906, a verification determination of a functionality of the hearing aid is received by the support computer. The verification determination may be based at least partially on whether the calibration of the hearing aid is within a valid calibration range. In step 908, an e-commerce transaction is authorized based on the verification determination.

Figure 10:
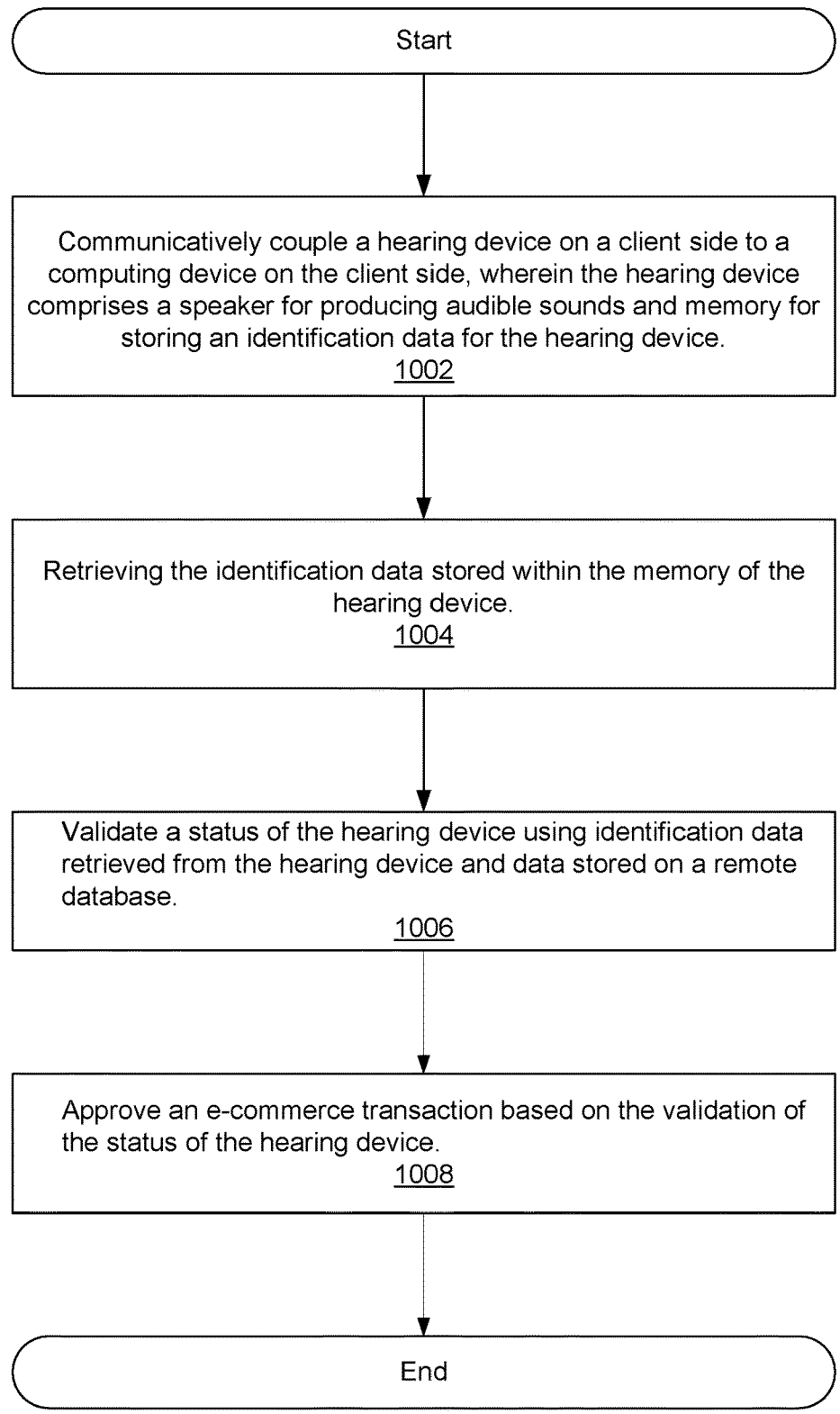
FIG. 10 is a flow chart representation for providing customer support for a hearing aid user, according to some examples.

FIG. 10 is a flow chart representation for a method, according to some examples. In step 1002, a hearing device on a client side is communicatively coupled to a computing device on the client side. The hearing device may comprise a speaker for producing audible sounds and memory for storing an identification data for the hearing device. In step 1004, the identification data stored within the memory of the hearing device is retrieved. In step 1006, a status of the hearing device is validated using identification data retrieved from the hearing device and data stored on a remote server. In step 1008, an e-commerce transaction is approved based on the validation of the status of the hearing device.

Figure 11:
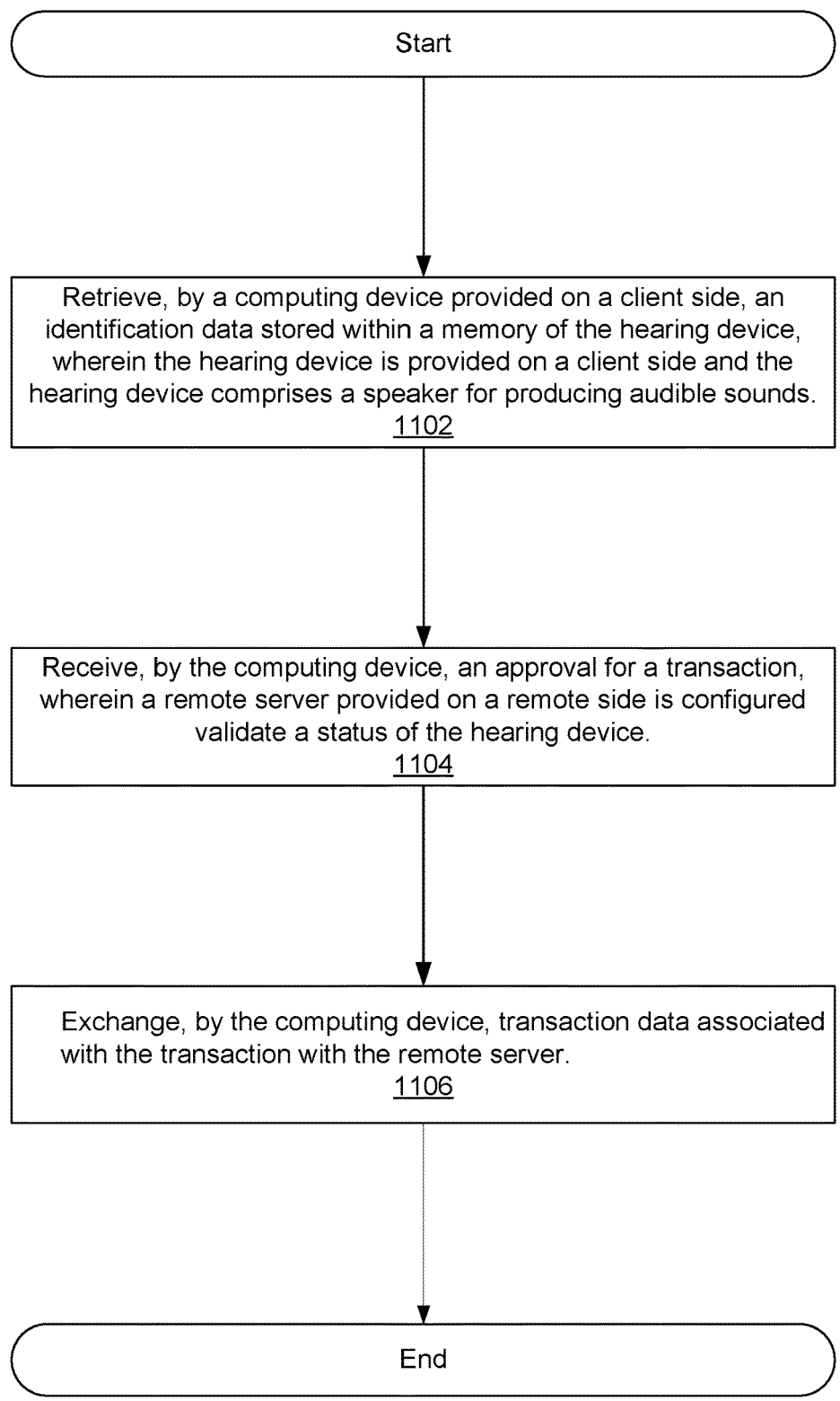
FIG. 11 is a flow chart representation for performing an e-commerce transaction for a hearing device provided on a client side, according to some examples.

FIG. 11 is a flow chart representation for a method, according to some examples. In step 1102, an identification data stored within a memory of the hearing device is retrieved by a computing device provided on a client side. The hearing device may be provided on a client side. The hearing device may comprise a speaker for producing audible sounds. In step 1104, an approval for a transaction may be received by the computing device. A remote server provided on a remote side may be configured to validate a status of the hearing device. In step 1106, transaction data associated with the transaction is exchanged by the computing device with the remote server.

Although embodiments of the invention are described herein, variations and modifications of these embodiments may be made, without departing from the true spirit and scope of the invention. Thus, the above-described embodiments of the invention should not be viewed as exhaustive or as limiting the invention to the precise configurations or techniques disclosed. Rather, it is intended that the invention shall be limited only by the appended claims and the rules and principles of applicable law.

What is claimed is:

1. A method comprising:
communicatively coupling a hearing device on a client side to a computing device on the client side, wherein the hearing device comprises a speaker for producing audible sounds and memory for storing an identification data for the hearing device;
retrieving the identification data stored within the memory of the hearing device;
validating a status of the hearing device using identification data retrieved from the hearing device and data stored on a remote database; and
approving an e-commerce transaction based on the validation of the status of the hearing device.

2. A method comprising:
retrieving, by a computing device provided on a client side, an identification data stored within a memory of the hearing device, wherein the hearing device is provided on a client side and the hearing device comprises a speaker for producing audible sounds;
receiving, by the computing device, an approval for a transaction, wherein a remote server provided on a remote side is configured validate a status of the hearing device; and
exchanging, by the computing device, transaction data associated with the transaction with the remote server.

3. A method comprising:
receiving, by a remote server provided on a remote side, identification data from a computing device provided on a client side, wherein the computing device is configured to retrieve the identification data stored in a memory of the hearing device, wherein the hearing device is provided on a client side;
retrieving a corresponding identification data from a remote database provided on the remote side;
determining, by the remote server, an approval for an e-commerce transaction by validating a status of the hearing device using the identification data;
delivering, by the remote server, the approval for the e-commerce transaction to the computing device; and
exchanging, by the remote server, transaction data associated with the e-commerce transaction with the computing device.

4. A method comprising:
generating an audible authentication message by a speaker of a hearing device responsive to a verification check request received form a remote server;
registering, by a computing device communicatively coupled to the hearing device, a user authentication entry following presentation of the audible authentication message to a user of the hearing device; and
transmitting the user authentication entry from the computing device to the remote server;
receiving an authorization for an e-commerce transaction from the remote server based on comparison between the audible authentication message and the user authentication entry.

5. The method of claim 4, wherein the audible authentication message is an audible message of a passcode.

6. The method of claim 4, further comprising receiving, by a microphone of any of the hearing device, the computing device, or a portable test unit, an audible authentication entry from the user.

7. The method of claim 6, further comprising using speech recognition to extract the user authentication entry from the audible authentication entry.

8. The method of claim 4, wherein the user authentication entry is registered using any of a mouse, keyboard, keypad, and a touch screen associated with the computing device.

9. The method of claim 8, wherein the user authentication entry is registered by presenting a set of authentication options to the user, wherein the set of authentication options comprise a correct user selection.

* * * * *